United States Patent [19]
Tang

[11] Patent Number: 5,987,704
[45] Date of Patent: Nov. 23, 1999

[54] DUAL AXIS HINGE APPARATUS WITH BRAKING MECHANISM

[75] Inventor: John G. Tang, San Carlos, Calif.

[73] Assignee: Apple Computer, Inc., Cupertino, Calif.

[21] Appl. No.: 09/061,018

[22] Filed: Apr. 15, 1998

[51] Int. Cl.[6] .................................................... E05D 7/00
[52] U.S. Cl. ................................ 16/354; 16/342; 74/98; 188/80; 361/681
[58] Field of Search ............................ 16/354, 366, 321, 16/341, 342; 74/98; 188/25, 80, 82.84; 361/683, 681

[56] References Cited

U.S. PATENT DOCUMENTS

| | | | |
|---|---|---|---|
| 2,072,028 | 2/1937 | Cooper | 16/354 |
| 4,091,907 | 5/1978 | Tabler | 188/80 |
| 4,916,926 | 4/1990 | Shieh | 16/354 |
| 5,103,376 | 4/1992 | Blonder | 361/681 |
| 5,109,573 | 5/1992 | Sherman | 16/342 |
| 5,363,089 | 11/1994 | Goldenberg | 16/354 |
| 5,867,872 | 2/1999 | Katoh | 16/354 |

FOREIGN PATENT DOCUMENTS

2171448A  8/1986  United Kingdom ..................... 16/354

*Primary Examiner*—Chuck Y. Mah
*Attorney, Agent, or Firm*—Beyer & Weaver, LLP

[57] ABSTRACT

An improved hinge mechanism for use with a portable computing device is disclosed. According to one embodiment, a hinge mechanism includes a first gear and a first deformable braking mechanism that is coupled to the first gear. The first deformable braking mechanism is substantially axially aligned with the first gear along a first axis. The hinge mechanism also includes a second gear that engages the first gear during rotation of the first gear, as well as a second braking mechanism. The second braking mechanism is arranged to be substantially axially aligned with the second gear along a second axis. The second braking mechanism contacts the first deformable braking mechanism to cause the first deformable braking mechanism to deform during rotation of the first gear. Finally, the hinge mechanism includes a linking mechanism that allows a constant distance to be maintained between the first axis and the second axis.

22 Claims, 6 Drawing Sheets

DUAL AXIS HINGE APPARATUS WITH BRAKING MECHANISM

BACKGROUND OF THE INVENTION

1. Field of the Invention

The present invention relates generally to hinge mechanisms. More particularly, the present invention relates to a hinge mechanism which is suitable for use in a portable computing device.

2. Description of the Related Art

The use of personal computers is widespread, and is rapidly becoming even more prevalent. As advances in technology enable the size of personal computers to decrease, the use of portable computers such as notebook, or laptop, computers and notepad computers is increasing. The portability of notebook computers and notepad computers enables a user to keep his or her computer readily accessible such that computing resources are effectively always at hand.

Figure 1:
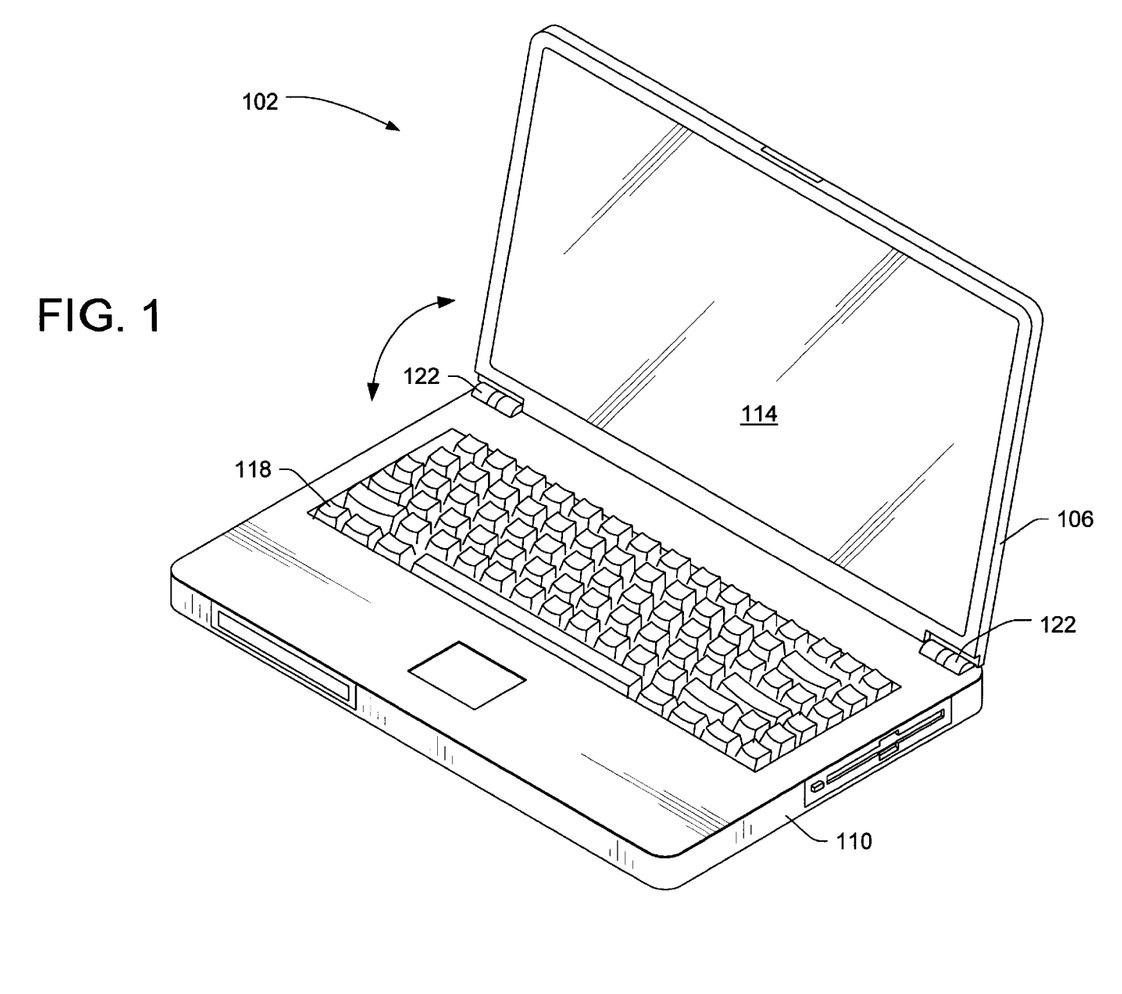
FIG. 1 is a diagrammatic representation of a notebook computer.

Many portable computers are configured such that a display screen of the computer pivots, or rotates, with respect to the base of the computer. FIG. 1 is a diagrammatic representation of a portable computer or, more specifically, a notebook computer 102. Notebook computer 102 includes a rotating, or hinging, section 106 and a fixed section 110. Rotating section 106 typically includes a display screen 114, while fixed section 110 often includes an input/output device such as a keyboard 118. fixed section 110 also houses a central processing unit and other computer hardware not shown).

Hinges 122 are used to allow rotating section 106 to rotate with respect to fixed action 110. As shown, rotating section 106 is "open" at approximately a 90 degree angle measured with respect to fixed section 110. The configuration of hinges 122 may be such that rotating section 106 is constrained to rotation within a certain range. Alternatively, in some cases, certain physical configurations of hinges 122 may enable a large range of rotation which may extend up to approximately 360 degrees.

Enabling rotating section 106 to rotate up to approximately 360 degrees with respect to fixed section 110 provides a user with the flexibility to place rotating section 106 in a variety of different orientations with respect to fixed section 110. For example, the user may allow rotating section 106 and fixed section 110 to both lie essentially flat on a planar surface. The user may also orient rotating section 106 or, more specifically, display screen 114, to face in the opposite direction from fixed section 110. Such an orientation may be desirable when notebook computer 102 is intended for use as a presentation device.

Figure 2A:
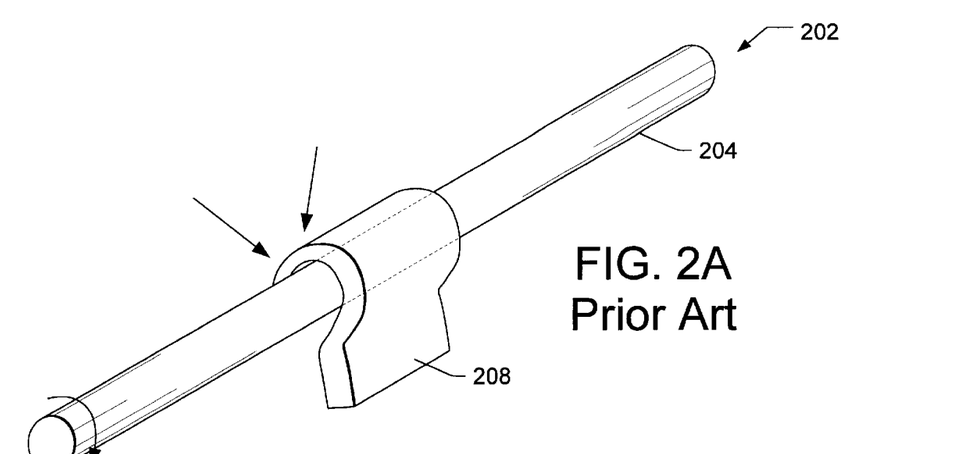
FIG. 2a is a diagrammatic representation of a conventional flat spring hinge that is used in notebook computers.
Figure 2B:
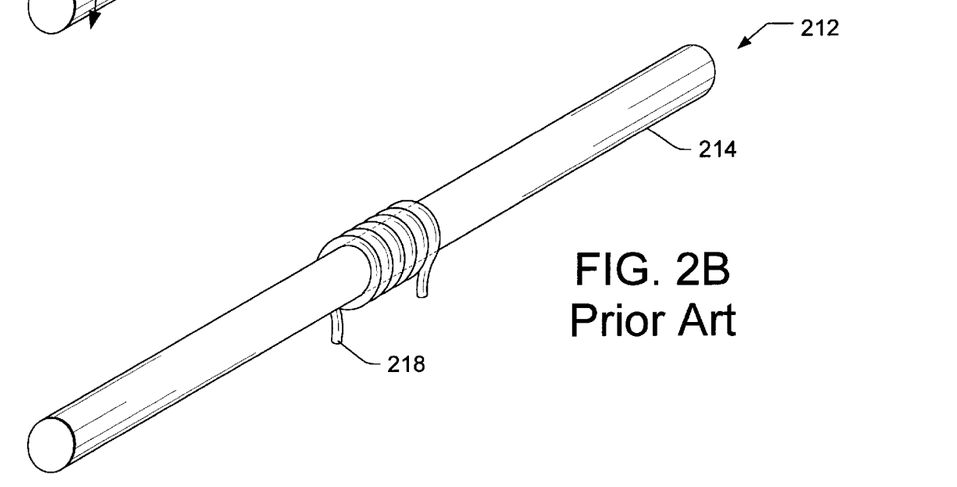
FIG. 2b is a diagrammatic representation of a conventional spring coil hinge that is used in notebook computers.
Figure 2C:
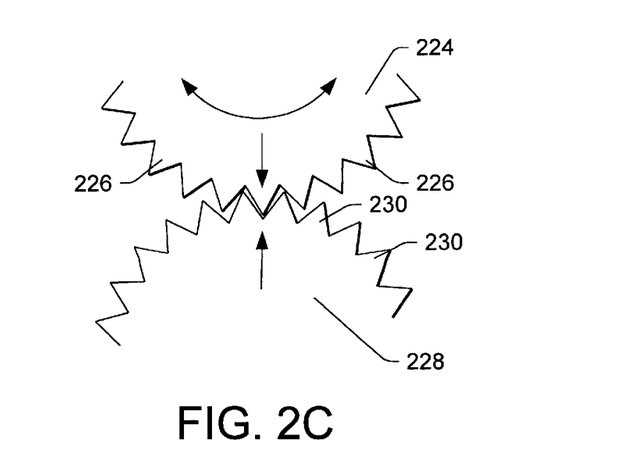
FIG. 2c is a diagrammatic representation of a deformable gear mechanism that is used as part of a hinge mechanism for a portable computing apparatus.

In order for rotating section 106 to be able to rotate and to hold a desired position at a given angle of rotation, hinges 122 typically include, or are associated with, brakes. The brakes, which are typically either spring-based or gear-based, as will be described below with reference to FIGS. 2a–2c, are used to effectively "lock" hinges 122 in place. Hinges 122 are locked into place to prevent rotation when no torque, or rotational force, is applied to hinges 122 or, more generally, to either rotating section 106 or fixed section 110.

FIG. 2a is a diagrammatic representation of a conventional flat spring hinge that is used in notebook and notepad computers. Flat spring hinge 202 includes an axle 204 which is used to couple a rotating section, e.g., rotating section 106 of FIG. 1, to a fixed section, e.g., fixed section 110 of FIG. 1. Axle 204 is arranged to couple the rotating section to the fixed section and to effectively serve as the axis of rotation of the rotating section with respect to the fixed section, as will be appreciated by those skilled in the art. Flat spring hinge 202 also includes a spring 208 that is effectively a friction spring. In other words, spring 208 provides the friction necessary to hold axle 204 in place once a rotational force is removed from axle 204. The friction provided by spring 208 basically enables spring 208 to clamp axle 204. In general, the shape, or configuration, of spring 208 may vary widely.

Flat spring hinge 202 typically does not support rotation of up to 360 degrees. That is, flat spring hinge 202 does not provide for 360 degree hinging. Since axle 204 provides only a single rotational axis that is shared by both a fixed section and a rotating section, configuring the fixed section and the rotating section to support 360 degree rotation is difficult, as will be appreciated by those skilled in the art.

Further, flat spring hinge 202 requires a relatively large amount of space to accommodate axle 204 and spring 208. As a result, the housings associated with fixed and rotating sections must also be relatively large in order to accommodate flat spring hinge 202. Since minimizing the size and the weight of notebook computers and other portable computing apparatus is generally desirable to enhance their portability, having a relatively large housing is usually not desirable.

Due to relatively high stresses that are experienced by flat spring hinge 202, flat spring hinge 202 is typically fabricated from metal. Hence, since housings in a notebook computer are often formed from plastic, flat spring hinge 202 may not be directly integrated into the housings. Therefore, manufacturing processes associated with fabricating notebook computers or, more specifically, coupling flat spring hinge 202 to both a rotating section and a fixed section, may be time-consuming.

Springs used in spring hinges often take on a variety of different configurations, as mentioned above. For example, a spring hinge may be a spring coil hinge that includes a coiled spring. FIG. 2b is a diagrammatic representation of a conventional spring coil hinge that is used in notebook computers. A spring coil hinge 212 is similar to flat spring hinge 202, as described above with respect to FIG. 2a Spring coil hinge 212 includes an axle 214 which is used to couple a rotating section to fixed section, and to serve as the axis of rotation of the rotating section with respect to the fixed section. Spring coil hinge 212 also includes a coiled spring 218 which provides the friction necessary to hold axle 214 in place once a rotational force is removed from axle 214. The friction provided by coiled spring 218 enables spring 218 to clamp axle 214.

Like flat spring hinge 202 of FIG. 2a, spring coil hinge 212 also does not typically support rotation of up to 360 degrees, due at least in part to the fact that axle 214 provides only a single rotational axis that is shared by both a fixed section and a rotating section. In addition, the space requirements of spring coil hinge 212 are comparable to those of flat spring hinge 202 of FIG. 2a. In other words, a relatively large amount of space to accommodate axle 214 and spring 218. Hence, the housings associated with fixed and rotating sections must also be relatively large in order to accommodate spring coil hinge 212.

In some portable computing apparatus, hinges which include deformable gears are used to allow a rotating section of the computing apparatus to rotate up to approximately 360 degrees with respect to a fixed section of the computing apparatus. FIG. 2c is a diagrammatic partial-view representation of a elastomeric gear mechanism that is used as part of a hinge for a portable computing apparatus. A first elastomeric gear 224, which may be axially coupled to a rotating section of a computing apparatus, includes teeth 226 that are effectively arranged to engage teeth 230 on a second elastomeric gear 228 that may be axially coupled to a fixed section of a computing apparatus. In general, one of first elastomeric gear 224 and second elastomeric gear 228 is fixed, e.g., second elastomeric gear 228 may be fixed while first elastomeric gear 224 rotates around second elastomeric gear 228. When a rotational force is applied to cause a rotating section to rotate with respect to a fixed section, teeth 226 engage teeth 230 to rotate first elastomeric gear 224 with respect to second elastomeric gear 228.

Once a rotational force is removed, the elastomeric properties of first elastomeric gear 224 and second elastomeric gear 228 cause them to deform against each other. As a result, friction is effectively created between first elastomeric gear 224 and second elastomeric gear 228 or, more specifically, teeth 226 and teeth 230. Hence, the rotated position of first elastomeric gear 224 is maintained until a rotational force is applied to rotate first elastomeric gear 224 with respect to second elastomeric gear 228.

While the use of elastomeric gears has been shown to be effective for providing up to approximately 360 degrees of hinging, machining elastomeric gears may be difficult. Elastomeric gears, e.g., rubber gears, may be difficult to accurately machine, as elastomeric materials are likely to deform while being machined. By way of example, deformation of elastomeric gears while teeth are being created along the circumference of the gears may cause the teeth to be inaccurately formed. As a result, when two elastomeric gears with defective teeth engage each other, they may not be able to accurately maintain a rotated position. Further, accurately machine teeth on deformable gears may be expensive.

Therefore, what is desired is a readily manufacturable hinge apparatus which allows for a wide range of rotation. Specifically, what is desired is an efficiently manufactured hinge apparatus that is suitable for use in a portable computing device and provides for a full, ie., up to approximately 360 degrees, range of rotation.

SUMMARY OF THE INVENTION

The present invention relates to a hinge apparatus which supports a substantially full range of rotation. According to one aspect of the present invention, a hinge mechanism includes a first gear and a first deformable braking mechanism that is coupled to the first gear such that it is substantially axially aligned with the first gear along a first axis. The hinge mechanism also includes a second gear that engages the first gear during rotation of the first gear, as well as a second braking mechanism, which is substantially axially aligned with the second gear along a second axis, that contacts the first deformable braking mechanism to cause the first deformable braking mechanism to deform during rotation of the first gear. Finally, the hinge mechanism includes a linking mechanism that allows a constant distance to be maintained between the first axis and the second axis.

In one embodiment, the first deformable braking mechanism has a substantially circular cross-section. In such an embodiment, the diameter of the first gear may be substantially equal to a diameter of the second gear, and the diameter of the first deformable braking mechanism is at least as large as the diameter of the first gear. Further, in such an embodiment, the second braking mechanism may be deformable and have a diameter that is substantially equal to the diameter of the first deformable braking mechanism.

In accordance with another aspect of the present invention, a rotating hinge mechanism is arranged to couple a first section to a second section, while enabling either the first section or the second section to rotate with respect to the other section. Such a rotating hinge mechanism includes a first wheel-gear pair that is coupled to the first section and includes a first wheel, which is substantially deformable, and a first gear. The rotating hinge mechanism also includes a second wheel-gear pair that is coupled to the second section, and includes a second gear and a second wheel. A linkage mechanism which is also a part of the rotating hinge mechanism is used to couple the first wheel-gear pair to the second wheel-gear pair, and is also used to maintain a substantially constant distance between a center point of the first gear and a center point of the second gear. In one embodiment, the first gear includes a plurality of teeth and the second gear includes a plurality of teeth, where the plurality of teeth of the first gear essentially mesh with the plurality of teeth of the second gear to allow the first gear to engage the second gear.

In another embodiment, the first gear is arranged to rotate up to approximately 360 degrees with respect to the second gear. In still another embodiment, the first section is a display section of a notebook computer apparatus and the second section is a base section of the notebook computer apparatus.

According to yet another aspect of the present invention, a computing apparatus includes a first housing, a processor contained substantially within the first housing, a display screen, and a hinge mechanism which rotatably couples the display screen to the first housing. Such a hinge mechanism includes a first wheel-gear pair and a second wheel-gear pair. The first wheel-gear pair includes a first gear and a first wheel, and is mechanically coupled to the display section, while the second wheel-gear pair includes a second gear and a second wheel, and is coupled to the first housing. The hinge mechanism also includes a linkage mechanism that couples the first wheel-gear pair to the second wheel-gear pair to allow the first gear to rotate and to engage the second gear while the first wheel contacts the second wheel. In one embodiment, the first wheel is arranged to deform during contact with the second wheel while the first gear rotates.

These and other advantages of the present invention will become apparent upon reading the following detailed descriptions and studying the various figures of the drawings.

BRIEF DESCRIPTION OF THE DRAWINGS

The present invention may best be understood by reference to the following description taken in conjunction with the accompanying drawings in which.

DETAILED DESCRIPTION OF THE INVENTION

Many hinges that are used in portable computing devices, e.g., notebook computers, are not capable of allowing for a wide range of rotation, due to mechanical constraints. As such hinges are often also bulky, the use of the hinges often results in the need to modify the housings of the computing devices to accommodate the hinges. While some hinges are suitable for use in providing for a wide rotational range, e.g., a rotational range of up to approximately 360 degrees, and enabling a desired position to be maintained, such hinges are often difficult to manufacture. By way of example, some hinges use elastomeric gears, which are often difficult to accurately machine due to the deformable properties of the gears. As such, the use of elastomeric gears may be relatively expensive.

A hinge which includes gears that are relatively undeformable and deformable wheels that serve as brakes to maintain a desired position allows for a wide range of rotation, and is relatively easy to manufacture. Such a hinge is arranged such that the deformable wheels deform against each other while the gears mesh. When a rotational force is applied to the hinge, the gears mesh to rotate while the deformable wheels deform against each other. Once a desired rotational position for the hinge is obtained and the rotational force is removed, the deformable wheels are arranged to interfere with each other. The interference between the deformable wheels allows the desired rotational position to be substantially maintained.

Figure 3:
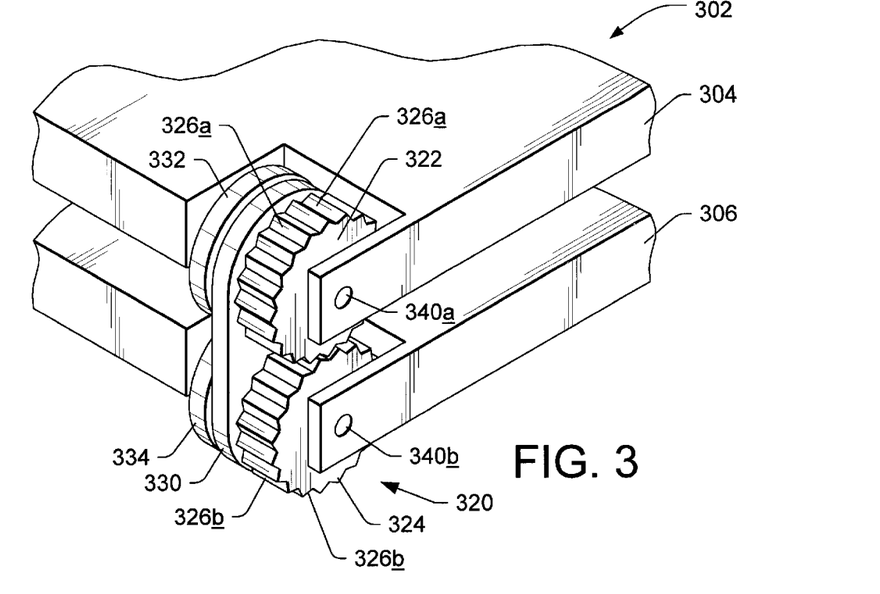
FIG. 3 is a diagrammatic representation of a 360 degree rotating hinge mechanism as used in a notebook computer in accordance with a first embodiment of the present invention.

With reference to FIG. 3, a hinge mechanism which is arranged to support approximately 360 degrees of rotation will be described in accordance with a first embodiment of the present invention. A "folding" apparatus, e.g., a notebook computer 302, generally includes a hinging section 304 and a fixed section 306. For notebook computer 302, hinging section 304 may include a display screen, while fixed section 306 may be arranged to house a central processing unit and a keyboard. A hinge mechanism 320 is arranged to essentially couple hinging section 304 to fixed section 306 such that hinging section 304 may rotate with respect to fixed section 306.

Hinge mechanism 320 includes a hinging gear 322 and a fixed gear 324 which are arranged to engage each other as hinging section 304 rotates with respect to fixed section 306. As shown, both hinging gear 322 and fixed gear 324 include teeth 326 which effectively mesh together as hinging gear 322 rotates about fixed gear 324. It should be appreciated that the sizes of hinging gear 322 and fixed gear 324, as well as the pitch of teeth 326 may be widely varied depending upon the requirements of notebook computer 302. In one embodiment, the cross-sectional diameters of hinging gear 322 and fixed gear 324 may be in the range of approximately three-eighth of an inch (approximately 9 millimeters) to approximately an inch (approximately 25 millimeters), while the number of teeth on each gear may vary from approximately twenty teeth to approximately forty teeth. By way of example, hinging gear 322 and fixed gear 324 may each have a diameter of approximately five-eighths of an inch (approximately 15 millimeters) and approximately twenty-six teeth.

A linkage mechanism 330, which is also included as a part of hinge mechanism 320, is arranged to couple hinging gear 322 and fixed gear 324 such that teeth 326a of hinging gear 322 may effectively engage teeth 326b of fixed gear 326b during rotation of hinging gear 322 with respect to fixed gear 324. In other words, linkage mechanism 330 serves as a coupling link which maintains an approximately constant distance between an axial center of hinging gear 322 and an axial center of fixed gear 324, as will be described below with reference to FIG. 4.

Hinge mechanism 320 also includes a hinging wheel 332 and a fixed wheel 334. In the described embodiment, hinging wheel 322 and fixed wheel 334 are both fabricated from a deformable material, e.g., an elastomeric material such as rubber. In other embodiments, however, it should be appreciated that one of hinging wheel 322 and fixed wheel 334 may be fabricated from a deformable material while the other is formed from a less deformable, e.g., substantially rigid, material.

Hinging wheel 332 and fixed wheel 334 are arranged to resist the rotation of hinging gear 322 with respect to fixed gear 324. Specifically, hinging wheel 332 deforms against fixed wheel 322 during rotation of hinging gear 322 with respect to fixed gear 324 to effectively provide a friction-like action against the rotation. Such a friction like action generally serves as a braking function which allows a position of hinging gear 322 to be maintained with respect to fixed gear 324 when a rotational force applied to hinging gear 322 ceases. That is, the deformation of hinging wheel 332 and fixed wheel 334 serves to hold hinging gear 322 in place, with reference to fixed gear 324, when a rotational force is removed from hinging gear 322.

In order for hinging wheel 332 and fixed wheel 334 to effectively resist the rotation of hinging gear 322, hinging wheel 332 and fixed wheel 334 are sized such that they each have a diameter that is at least as large as the diameter of hinging gear 322. That is, hinging wheel 332 and fixed wheel 334 are sized such that there is an interference fit between hinging wheel 332 and fixed wheel 334. Typically, hinging wheel 332 and fixed wheel 334 have diameters which are greater than the diameter of hinging gear 322. When the diameters of hinging wheel 322 and fixed wheel 334 are larger than the diameter of hinging gear 322, hinging wheel 322 and fixed wheel 334 deform against each other to provide resistance to rotation. Hence, unless a rotational force, e.g., torque, is applied to hinging gear 322, hinging wheel 322 and fixed wheel 334 provide enough resistance to prevent hinging gear 322 from rotating with respect to fixed gear 324.

While the diameters of hinging wheel 332 and fixed wheel 334 may be widely varied, in the described embodiment, hinging wheel 332 and fixed wheel 334 have a diameter in the range of approximately one-sixteenth of an inch (approximately 1.5 millimeters) to approximately one-fourth of an inch (approximately 6 millimeters) greater than the diameter of hinging gear 322. By way of example, hinging wheel 332 and fixed wheel 334 may have diameters of approximately one-eighth of an inch (approximately 3 millimeters) greater than the diameter of hinging gear 322. In some embodiments, either or both hinging wheel 332 and fixed wheel 334 may vary in shape in order to provide varied torque, or "friction," throughout rotation.

Generally, as mentioned above, linkage mechanism 330 effectively couples hinging gear 322 to fixed gear 324. Linkage mechanism 330 also serves to couple hinging wheel 332 to fixed wheel 334. As such, linkage mechanism 330 may be considered to be a coupling link that couples a hinging wheel-gear pair, i.e., hinging wheel 332 and hinging gear 332, to a fixed wheel-gear pair, i.e., fixed wheel 334 and fixed gear 334.

Hinge mechanism 320 may generally be joined to hinging section 304 and fixed section 306 using any suitable mechanism. By way of example, a dowel pin 340a may be used to effectively couple hinging gear 322, linkage mechanism 330, and hinging wheel 332 to hinging section 304. Such a dowel pin 340a, or axle, may pass through the rotational axis, e.g., axial center, of hinging gear 322. In one embodiment, dowel pin 340a may also pass through the axial center of hinging wheel 332. Similarly, a dowel pin 340b may be used to couple fixed gear 324, linkage mechanism 330, and fixed wheel 334 to fixed section 306.

Figure 4:
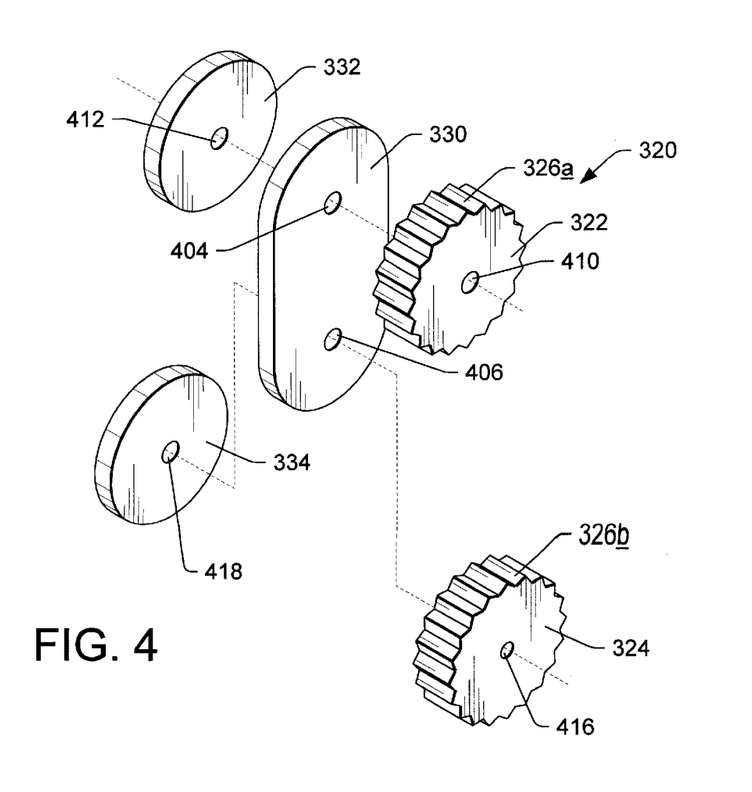
FIG. 4 is a diagrammatic exploded representation of the 360 degree rotating hinge mechanism of FIG. 3, i.e., hinge mechanism 320, in accordance with the embodiment of the present invention.

Referring next to FIG. 4, hinge mechanism 320 of FIG. 3 will be described in more detail in accordance with the first embodiment of the present invention. FIG. 4 represents an exploded, slightly enlarged view of hinge mechanism 320. In the described embodiment, linkage mechanism 330 is a plate with two openings 404, 406. Opening 404 is arranged such that a dowel pin, e.g., dowel pin 340a of FIG. 3, or similar mechanism, may pass through opening 404 and through an axial center 410 of hinging gear 322, as well as though a center 412 of hinging wheel 332. Similarly, opening 406 is arranged to accommodate a dowel pin such as dowel pin 340b of FIG. 3, or a similar mechanism, may pass through opening 406, as well as through an axial center 416 of fixed gear 324 and a center 418 of fixed wheel 334. As shown, for ease of illustration, fixed gear 324 and fixed wheel 334 have been shown as being offset from linkage mechanism 330.

Substantially any suitable material may be used in the fabrication of gears 322, 324. Typically, gears 322, 324 may be formed from materials which are lightweight, durable, and relatively uncomplicated to machine or to mold. For example, gears may be formed from a metallic material, such as aluminum, or a plastic material. Linkage mechanism 330 may also generally be formed from a variety of different materials. Materials which may be used in the fabrication of linkage mechanism include, but are not limited to, materials such as metals, brass, and plastic. As described above, wheels 332, 334 may be formed from materials which deform. That is, wheels 332, 334 may be formed from materials which allow wheels 332, 334 to deform when they come into contact. Such materials include, but are not limited to, elastomers, or elastomeric materials, such as rubber. In one embodiment, wheels 332, 334 may be structured as essentially rigid, e.g., metal or plastic, disks around which a relatively thick deformable layer is formed.

In general, a hinge mechanism which supports approximately 360 degrees of rotation may support any number of different "open" configurations. That is, a hinging section and a fixed section of an apparatus that are rotatably coupled by a hinge mechanism which supports approximately 360 degrees of rotation may be held such that hinging section is maintained at a variety of different angular positions with respect to the fixed section. The deformation of a hinging wheel with respect to a fixed wheel in the hinge mechanism enable different angular positions to be maintained a force used to rotate the hinging section is removed.

Figure 5A:
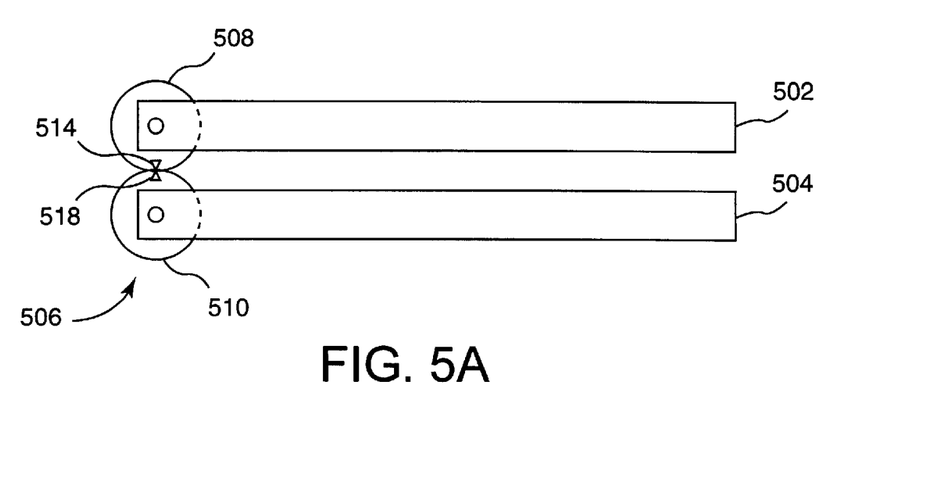
FIG. 5a is a schematic representation of the orientation of a hinging section and a fixed section of a notebook computer with a hinge mechanism at approximately zero degrees of rotation in accordance with the first embodiment of the present invention.

FIG. 5a is a schematic representation of the orientation of a hinging section and a fixed section of a notebook computer with a hinge mechanism at approximately zero degrees of rotation in accordance with the first embodiment of the present invention. A hinging section 502, e.g., a display section of a notebook computer, is coupled to a fixed section 504, e.g., a base of a notebook computer, through a hinge mechanism 506. For illustrative purposes, while hinge mechanism generally includes a hinging gear 508, a fixed gear 510, a linkage mechanism, a hinging wheel, and a fixed wheel, substantially only hinging gear 508 and fixed gear 510 are shown. In addition, while hinging gear 508 and fixed gear 510 generally include teeth or similar parts which are arranged to mesh during rotation of hinging gear 508 with respect to fixed gear 510, for ease of illustration, teeth have not been shown.

When hinging section 502 is rotated zero degrees with respect to fixed section 504, hinging gear 508 is effectively in a "rest position." As shown, a reference indicator 514 that is fixed to hinging gear 508 is aligned with a fixed reference indicator 518 that is attached to fixed gear 5 10. In the described embodiment, when reference indicator 514 is aligned with reference indicator 518, hinge mechanism 510 is considered to be in a rest, or unrotated, position. Hinge mechanism 510 may generally be held in a rest position using a hinging wheel (not shown) and a fixed wheel (not shown), as described above with respect to FIG. 3.

When hinging section 502 is to be "opened" with respect to fixed section 504, a torque, or a rotational force, may be applied to hinging section 502 and, hence, to hinging gear 508. The hinging wheel (not shown) and the fixed wheel (not shown), as described above with reference to FIG. 3, are arranged such that when a torque is removed, hinging section 502 remains substantially in the position it was in when the torque is removed. In general, the number of positions, i.e., angular positions, at which hinging section 502 may remain at with respect to fixed section 504 is dependent upon factors which include, but are not limited to, the pitch of teeth on hinging gear 508 and fixed gear 510. By way of example, when hinging gear 508 and fixed gear 510 include a large number of teeth, the number of angular positions at which hinging section 502 may be held will be relatively large. When the circumferences of hinging gear 508 and fixed gear 510 are effectively covered with teeth, then hinging gear 508 may rotate up to approximately 360 degrees with respect to fixed gear 510.

Figure 5B:
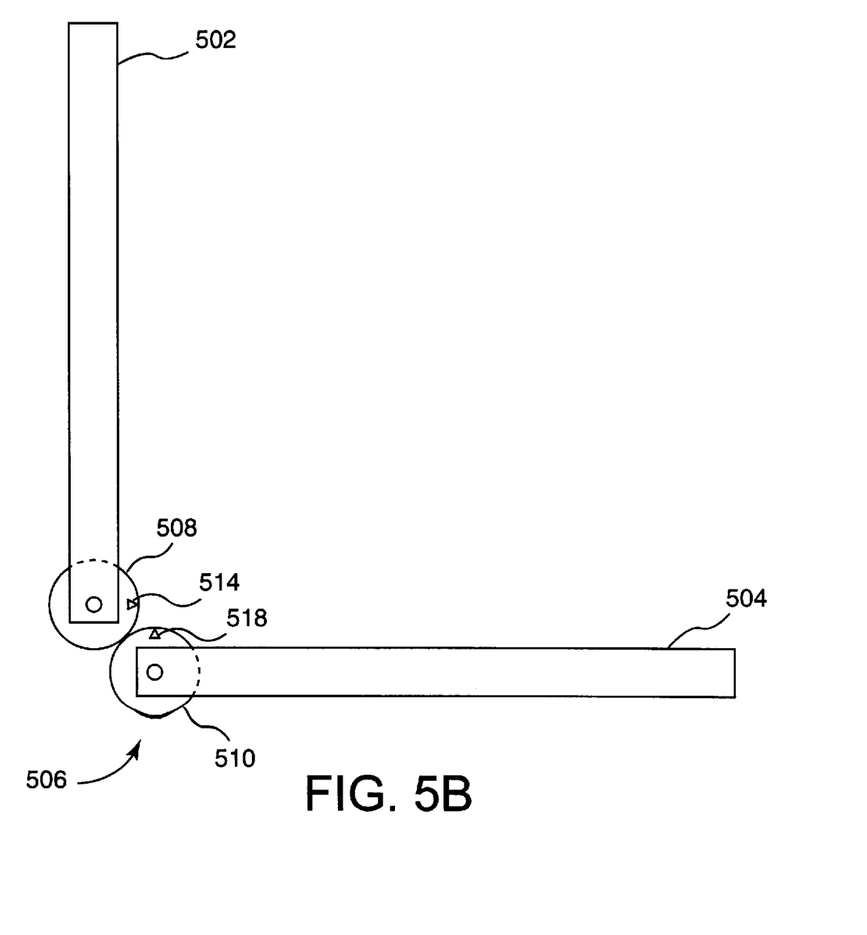
FIG. 5b is a schematic representation of the orientation of the hinging section and the fixed section of FIG. 5a with the hinge mechanism at approximately 90 degrees of rotation in accordance with the first embodiment of the present invention.
Figure 5C:
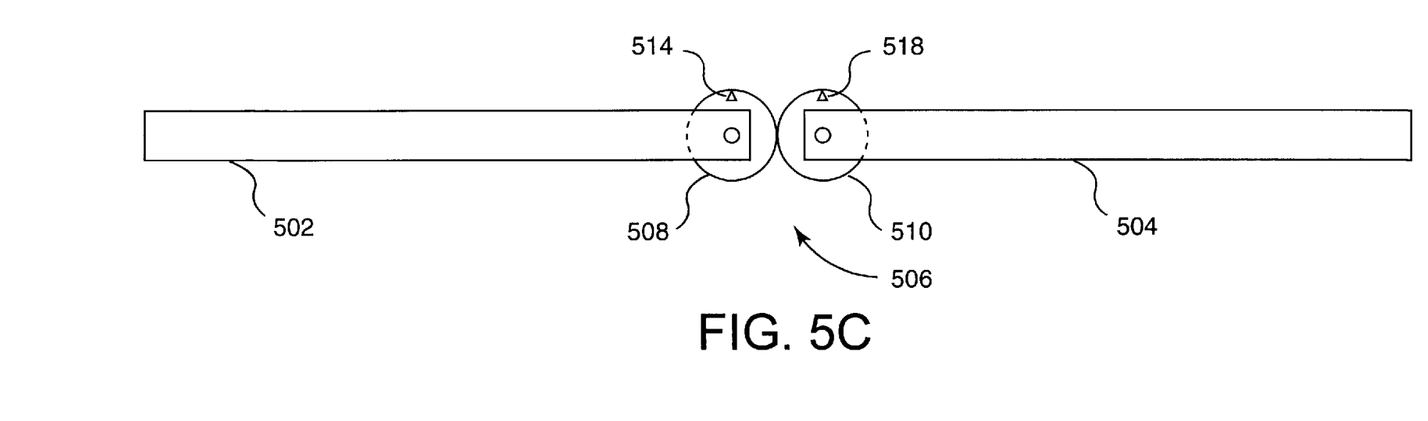
FIG. 5c is a schematic representation of the orientation of the hinging section and the fixed section of Figure Sa with the hinge mechanism at approximately 180 degrees of rotation in accordance with the first embodiment of the present invention.
Figure 5D:
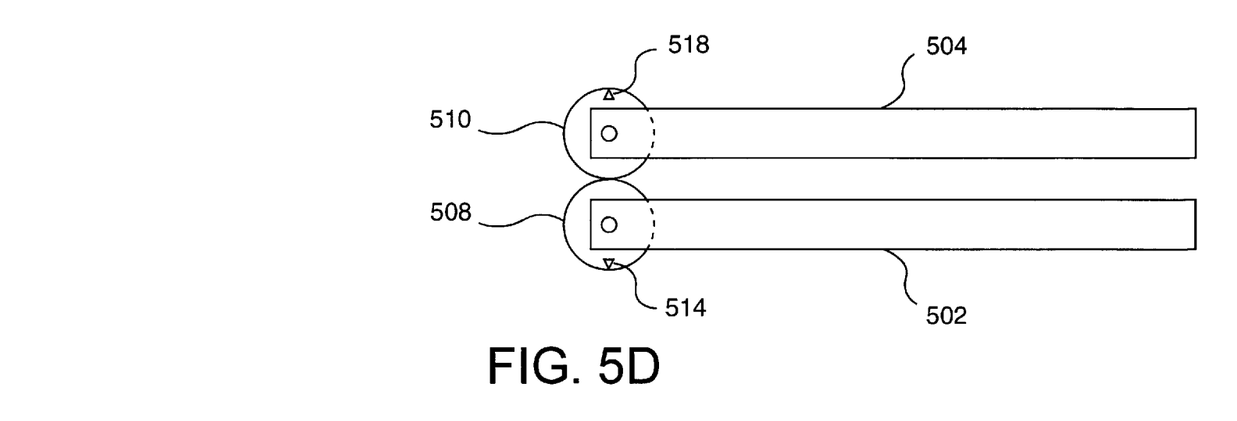
FIG. 5d is a schematic representation of the orientation of the hinging section and the fixed section of FIG. 5a with the hinge mechanism at approximately 360 degrees of rotation in accordance with the first embodiment of the present invention.

FIG. 5b is a schematic representation of the orientation of hinging section 502 and fixed section 504 of FIG. 5a when hinge mechanism 506 holds hinging section 502 at approximately a 90 degree angle in accordance with the first embodiment of the present invention. When hinging section 502 is open at approximately a 90 degree angle with respect to fixed section 504, reference indicator 514 is at a 90 degree offset from reference indicator 518. FIG. 5c is a schematic representation of the orientation of hinging section 502 and fixed section 504 when hinging section 502 is rotated at approximately a 180 degree angle with respect to fixed section 504. Finally, FIG. 5d is a schematic representation of the orientation of hinging section 502 and fixed section 504 when hinging section 502 is opened to approximately a 360 degree angle with respect to fixed section 504.

Figure 6:
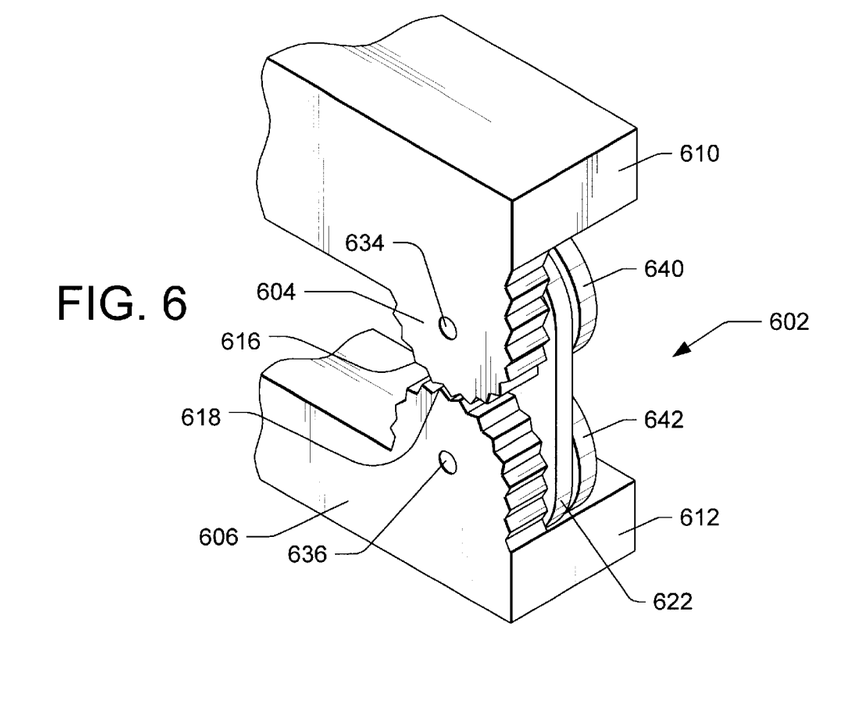
FIG. 6 is diagrammatic representation of a rotating hinge mechanism as used in a notebook computer in accordance with a second embodiment of the present invention.

The overall configuration of a hinge mechanism which uses a pair of gears, a linkage mechanism, and a pair of deformable wheels may be widely varied. By way of example, gears may be formed as part of hinging and fixed sections in a notebook computer housing, rather than being formed as separate pieces which may then be coupled to the notebook computer housing. FIG. 6 is a diagrammatic representation of a rotating hinge mechanism that is suitable for use in a notebook computer in accordance with a second embodiment of the present invention. A hinge mechanism 602 is arranged such that a hinging gear 604 and a fixed gear 606 are effectively attached to a hinging section 610 and a fixed section 612, respectively. Specifically, in the embodiment as shown, hinging gear 604 is integrally formed with hinging section 610, while fixed gear 606 is integrally formed with fixed section 612. As such, hinging gear 604 may be formed from the same material as hinging section 610, and fixed gear 606 may be formed from the same material as fixed section 612. When hinging section 610 and fixed section 612 are associated with a notebook computer, then hinging gear 604 and fixed gear 606, as well as hinging section 610 and fixed section 612, may be formed from a plastic material.

In the described embodiment, hinging gear 604 and fixed gear 606 are effectively "squared off." That is, hinging gear 604 and fixed gear 606 are arranged to constrain rotation of hinging gear 604 with respect to fixed gear 606 by preventing hinging gear 604 from rotating past a given point. In order to constrain rotation, hinging gear 604 and fixed gear 606 are shaped to include physical brakes, or "stops," in the form of squared edges. In some embodiments, only one of hinging gear 604 and fixed gear 606 may be squared off to prevent rotation of hinging gear 604 past a given point. Although the range of rotation of hinging gear 604 may generally be varied, as shown, hinging gear 604 is arranged to rotate in the range of approximately zero degrees to approximately 180 degrees. It should be appreciated, however, that in other embodiments, hinging gear 604 and fixed gear 606 may be integrated into hinging section 610 and fixed section 612, respectively, while still allowing for rotation of up to approximately 360 degrees.

Hinging gear 604 includes teeth 616 which are effectively arranged to engage teeth 618 of fixed gear 606 during rotation of hinging gear 604 with respect to fixed gear 606. In the embodiment as shown, since hinging gear 604 and fixed gear 606 are arranged to constrain rotation, teeth 616 and teeth 618 are also arranged to constrain rotation. That is, teeth 616 of hinging gear 604 and teeth 618 of fixed gear 606 are implemented along the circumference of hinging gear 605 and fixed gear 606, respectively, in such as manner as to permit rotation of up to approximately 180 degrees.

Hinge mechanism 602 also includes a linkage mechanism 622 that allows a substantially constant distance to be maintained between a central point 634 of hinging gear 604 and a central point 636 of fixed gear 606. Linkage mechanism 622 further serves to couple a hinging wheel 640 and a fixed wheel 642. As previously described, hinging wheel 640 and fixed wheel 642 are typically deformable wheels that are at least partially formed from an elastomer. The durometer, e.g., hardness, of hinging wheel 640 and fixed wheel 642 may generally be varied depending upon the desired amount of interference, or resistance to rotation, between hinging wheel 640 and fixed wheel 642.

Figure 7:
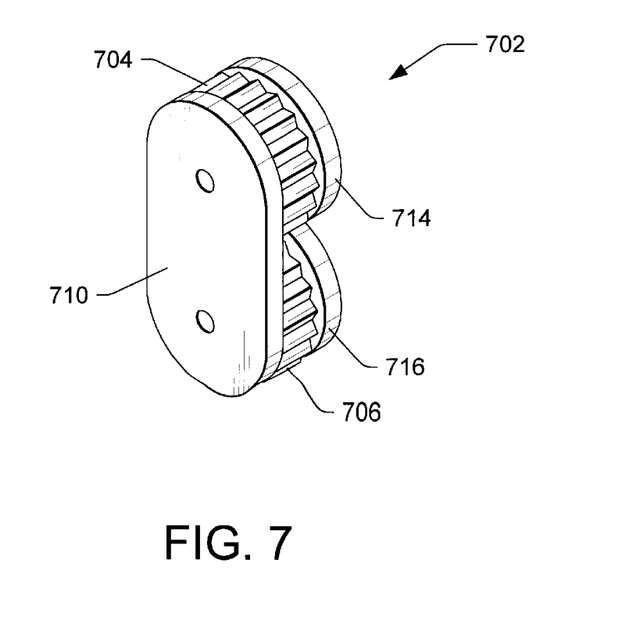
FIG. 7 is a diagrammatic representation of a rotating hinge mechanism in accordance with a third embodiment of the present invention.

FIG. 7 is a diagrammatic representation of a rotating hinge mechanism in accordance with a third embodiment of the present invention. Hinge mechanism 702 is similar to hinge mechanism 320 of FIG. 3 in that hinge mechanism 702 includes a hinging gear 704, a fixed gear 706, a linkage mechanism 710, a hinging wheel 714, and a fixed wheel 716. However, the arrangement of hinge mechanism 702 is such that linkage mechanism 710 does not lie between hinging gear 704 and hinging wheel 714. Instead, hinging gear 704 and hinging wheel 714 are arranged such that they may directly contact each other. Hence, fixed gear 706 and fixed wheel 716 are also arranged such that they may come into direct contact.

In one embodiment, hinging wheel 714 and fixed wheel 716 may effectively be formed by securing relatively thin rubber washers at the sides of hinging gear 704 and fixed gear 706, respectively. In other words, hinge mechanism 702 may be formed such that hinging wheel 714 is an extension of hinging gear 704 and fixed wheel 716 is an extension of fixed gear 706.

Although only a few embodiments of the present invention have been described, it should be understood that the present invention may be embodied in many other specific forms without departing from the spirit or the scope of the invention. By way of example, a dual axis hinge mechanism, such as one which may support up to approximately 360 degrees of rotation, has been described as being suitable for use in a notebook computing device. In general, as will be appreciated by those skilled in the art, the hinge mechanism may be used a variety of other devices as well. Such devices may include, but are not limited to, notepad computers, personal electronic organizers, and calculators.

While a hinge mechanism has generally been described as having a hinging gear and a fixed gear which are of approximately the same size, the hinging gear and the fixed gear may be of different sizes. In general, a hinging gear has been described as having a diameter which is approximately equal to the diameter of a corresponding fixed gear. However, a hinging gear may have a diameter which is greater than the diameter of the corresponding fixed gear. Alternatively, the fixed gear may have a diameter which is greater than the diameter of the corresponding hinging gear. By varying the diameters of the gears, the granularity associated with the rotation of a hinging gear may be modified. In addition, varying the diameters allows the amount of torque necessary to cause rotation to be adjusted as well.

For embodiments in which one gear in a hinge mechanism has a greater diameter than the other gear, the size of the corresponding wheels may be scaled based upon the size of the gears. For example, if the hinging gear has a larger diameter than the fixed gear, then the hinging wheel may have a larger diameter than the fixed wheel. It should be appreciated that the diameter of the hinging wheel in such a case will generally be greater than the diameter of the hinging gear, while the diameter of the fixed wheel will be greater than the diameter of the fixed gear.

In some embodiments, only one wheel in a hinge mechanism may be deformable. That is, one wheel may be deformable while the other wheel is essentially rigid, or is at least less deformable than the deformable wheel. As will be understood by those skilled in the art, when only one wheel in a hinge mechanism is effectively deformable, the wheel deforms against the essentially rigid wheel to provide a friction-like action that counteracts movement of the associated gears during rotation of the gears.

While deformable wheels have been described as having a substantially circular cross-sectional shape, it should be appreciated that the deformable wheels may generally take on any suitable shape. For example, the wheels may have an ellipsoidal shape. Alternatively, the wheels may have an irregular shape, such as a shape in which a portion of the wheel is rounded while another portion of the wheel is squared off without departing from the spirit or the scope of the present invention. Wheels with irregular shapes may be particularly suitable for configurations in which a hinge mechanism is arranged to constrain a range of rotation. In other words, a wheel with a "stop" built into it may be suitable to prevent rotation from moving past a certain limit. Wheels with non-circular cross-sectional shapes may also be used in some embodiments to allow for a varied torque, or "friction," throughout the rotation of associated gears.

Further, a wheel that is coupled to a hinging section of an apparatus is not constrained to having substantially the same shape as a wheel that is coupled to a fixed section of the apparatus. For instance, a wheel coupled to the hinging section may have a circular cross-section, whereas the wheel coupled to the fixed section may have an ellipsoidal cross-section. It should be appreciated, however, that the shape of both wheels may generally be widely varied.

In addition, the wheels may not necessarily be of approximately the same size. That is, when both wheels have a roughly circular cross-section, the diameter of one wheel may be larger than the diameter of the other wheel. Alternatively, for wheels which have different shapes, the cross-sectional area of one wheel may be greater than the cross-sectional area of the other wheel without departing from the spirit or the scope of the present invention.

While altering the shape of gears, e.g., squaring of gears, has been described as being a suitable method for limiting the rotational range of the gears, it should be appreciated that a variety of different methods may be used to limit the rotational range of the gears. By way of example, physical stops may be implemented in a fixed section or a hinging section to constrain rotation of gears. Alternatively, physical stops may be implemented in either or both a fixed wheel and a hinging wheel to limit the rotational range of the gears. Further, although gears which have been integrated into housings have been described as potentially being squared off, it should be understood that gears which have not been integrated into housings may also be squared off.

In lieu of using teeth, which may be of substantially any shape, to allow a hinging gear to engage a fixed gear during rotation, generally any suitable mechanism may be used to cause the hinging gear to engage the fixed gear without departing from the spirit or the scope of the present invention. Other suitable mechanisms may include, but are not limited to, mechanical arrangements where protrusions on one gear engage openings on the other gear, and mechanical arrangements where protrusions on one gear contact protrusions on the other gear to effectively engage the other gear.

Although the use of reference indicators, as discussed above with reference to FIGS. 5a–5d, may be useful for use in gauging the rotation of a hinging gear, it should be appreciated that the use of reference indicators is optional. In some cases, no indicators may be arranged to identify the amount a hinging gear rotates.

Therefore, the above-described examples or embodiments are to be considered as illustrative and not restrictive, and the invention is not to be limited to the details given herein, but may be modified within the scope of the appended claims.

What is claimed is:

1. A hinge mechanism comprising:
   a first gear rotatable about a first axis;
   a first deformable braking mechanism, the first deformable braking mechanism being coupled to the first gear, wherein the first deformable braking mechanism is substantially axially aligned with the first gear along said first axis;
   a second gear rotatable about a second axis, the second gear being arranged to engage the first gear during rotation of one of the first gear and the second gear;
   a second braking mechanism, the second braking mechanism being arranged to contact the first deformable braking mechanism to cause the first deformable braking mechanism to deform during the rotation, wherein the second braking mechanism is substantially axially aligned with the second gear along said second axis; and
   a linking mechanism, the linking mechanism being arranged to maintain a constant distance between the first axis and the second axis.

2. A hinge mechanism according to claim 1, wherein the first gear includes a tooth arrangement that is arranged to engage a tooth arrangement located on the second gear during the rotation.

3. A hinge mechanism according to claim 1, wherein the first deformable braking mechanism has a substantially circular cross-section.

4. A hinge mechanism according to claim 3, wherein a diameter of the first gear is substantially equal to a diameter of the second gear, and a diameter of the first deformable braking mechanism is at least greater than or equal to the diameter of the first gear.

5. A hinge mechanism according to claim 4, wherein the second braking mechanism is a deformable braking mechanism, and the second braking mechanism has a diameter that is substantially equal to the diameter of the first deformable braking mechanism.

6. A hinge mechanism according to claim 1, wherein the first deformable braking mechanism is formed from an elastomer.

7. A hinge mechanism according to claim 1, wherein the second braking mechanism is a deformable braking mechanism.

8. A rotating hinge mechanism arranged to couple a first section of a device to a second section of said device, the rotating hinge mechanism being arranged to enable the first section to rotate with respect to the second section, the rotating hinge mechanism comprising:
   a first wheel-gear pair coupled to the first section, the first wheel-gear pair including a first gear and a first wheel, the first wheel being substantially deformable;
   a second wheel-gear pair coupled to the second section, the second wheel-gear pair including a second gear and a second wheel; and
   a linkage mechanism, the linkage mechanism being arranged to couple the first wheel-gear pair to the second wheel-gear pair and to maintain a substantially constant distance between a center point of the first gear and a center point of the second gear, wherein the first gear is arranged to rotate and to engage the second gear, and wherein the first wheel is arranged to contact the second wheel.

9. A rotating hinge mechanism according to claim 8, wherein the first gear includes a plurality of teeth and the second gear includes a plurality of teeth, the plurality of teeth of the first gear being arranged to mesh with the plurality of teeth of the second gear to allow the first gear to engage the second gear.

10. A rotating hinge mechanism according to claim 8, wherein the first gear has a diameter that is substantially equal to a diameter of the second gear, and the first wheel has a diameter that is substantially equal to a diameter of the second wheel, the diameter of the first wheel being larger than the diameter of the first gear.

11. A rotating hinge mechanism according to claim 10, wherein:

the first wheel and the first gear have a first common axis;

the second wheel and the second gear have a second common axis; and the first wheel and the second wheel are arranged to deform during contact when the first gear rotates with respect to the second gear.

12. A rotating hinge mechanism according to claim 11, wherein deformation of the first wheel and the second wheel is arranged to allow a position of the first section to be maintained with respect to the second section when the first gear is not rotating.

13. A rotating hinge mechanism according to claim 10, wherein the first wheel is formed from an elastomer.

14. A rotating hinge mechanism according to claim 13, wherein the second wheel is formed from the elastomer.

15. A rotating hinge mechanism according to claim 8, wherein the first gear is arranged to rotate up to approximately 360 degrees with respect to the second gear.

16. A rotating hinge mechanism according to claim 8, wherein the first section is a display section of a notebook computer apparatus and the second section is a base section of the notebook computer apparatus.

17. A computing apparatus, the computing apparatus comprising:

a first housing;

a processor contained substantially within the first housing;

a display screen; and a hinge mechanism arranged to rotatably couple the display screen to the first housing, wherein the hinge mechanism includes a first wheel-gear pair and a second wheel-gear pair, the first wheel-gear pair having a first gear and a first wheel, the first wheel-gear pair being mechanically coupled to the display screen, the second wheel-gear pair having a second gear and a second wheel, the second wheel-gear pair being coupled to the first housing, the hinge mechanism further including a linkage mechanism arranged to couple the first wheel-gear pair to the second wheel-gear pair, wherein the first gear is arranged to rotate and to engage the second gear while the first wheel contacts the second wheel.

18. A computing apparatus as recited in claim 17, wherein the first wheel is arranged to deform during contact with the second wheel while the first gear rotates.

19. A computing apparatus as recited in claim 17, wherein the second wheel is arranged to deform during contact with the first wheel while the first gear rotates.

20. A computing apparatus as recited in claim 17, wherein at least one of the first wheel and the second wheel are arranged to deform during contact of the first wheel and the second wheel, and wherein the deforming of at least one of the first wheel and the second wheel operates to hold the display screen in a rotated position with respect to the first housing.

21. A computing apparatus as recited in claim 17, wherein:

the first gear has a first gear diameter;

the second gear has a second gear diameter, the second gear diameter being substantially equal to the first gear diameter;

the first wheel has a first wheel diameter; and the second wheel has a second wheel diameter, the second wheel diameter being substantially equal to the first wheel diameter, wherein the first wheel diameter is greater than or equal to the first gear diameter.

22. A computing apparatus as recited in claim 17, wherein the first gear is integrally formed with the display screen, and the second gear is integrally formed with the first housing.

* * * * *